US008275814B2

(12) United States Patent
Kim et al.

(10) Patent No.: US 8,275,814 B2
(45) **Date of Patent: *Sep. 25, 2012**

(54) METHOD AND APPARATUS FOR ENCODING/DECODING SIGNAL

(75) Inventors: Tae Hyeon Kim, Seoul (KR); Hyouk Jean Cha, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 593 days.

This patent is subject to a terminal disclaimer.

(21) Appl. No.: 12/309,107

(22) PCT Filed: Jul. 12, 2007

(86) PCT No.: PCT/KR2007/003378

§ 371 (c)(1), (2), (4) Date: Mar. 24, 2009

(87) PCT Pub. No.: WO2008/007905

PCT Pub. Date: Jan. 17, 2008

(65) Prior Publication Data

US 2010/0241953 A1 Sep. 23, 2010

Related U.S. Application Data

(60) Provisional application No. 60/830,086, filed on Jul. 12, 2006, provisional application No. 60/831,921, filed on Jul. 20, 2006, provisional application No. 60/852,702, filed on Oct. 19, 2006, provisional application No. 60/852,703, filed on Oct. 19, 2006, provisional application No. 60/854,084, filed on Oct. 25, 2006, provisional application No. 60/879,566, filed on Jan. 10, 2007, provisional application No. 60/879,569, filed on Jan. 10, 2007, provisional application No. 60/881,142, filed on Jan. 19, 2007, provisional application No. 60/907,809, filed on Apr. 18, 2007.

(51) Int. Cl.
*G06F 12/00* (2006.01)
*G06F 17/30* (2006.01)

(52) U.S. Cl. ........ 707/821; 707/913; 707/915; 707/916; 707/955

(58) Field of Classification Search .................. 707/736, 707/802, 913, 915, 821, 916, 955
See application file for complete search history.

(56) References Cited

U.S. PATENT DOCUMENTS 5,835,671 A * 11/1998 Kitamura et al. ............ 386/243
(Continued)

FOREIGN PATENT DOCUMENTS

EP 1 089 572 4/2001
(Continued)

OTHER PUBLICATIONS

Notice of Allowance for corresponding Korean Application No. 10-2009-7010175 dated Apr. 26, 2011.

(Continued)

*Primary Examiner* — Phong Nguyen
(74) *Attorney, Agent, or Firm* — Harness, Dickey & Pierce, P.L.C.

(57) ABSTRACT

The disclosed embodiments relate to a multimedia data encoding/decoding method and apparatus. In some aspects, an encoding method includes generating a file type area having information on a file format; generating a data area comprising a plurality of media data areas; and generating a media information area comprising a plurality of track areas corresponding to the plurality of media data areas, respectively. According to one aspect, the multimedia data encoding/decoding method and apparatus can construct a slide show using only a small amount of multimedia data. Thus, a time taken to process and transmit the multimedia data can be reduced.

23 Claims, 12 Drawing Sheets

U.S. PATENT DOCUMENTS

| | | | | |
|---|---|---|---|---|
| 5,956,729 | A | 9/1999 | Goetz et al. | |
| 6,360,234 | B2 | 3/2002 | Jain et al. | |
| 6,369,835 | B1 * | 4/2002 | Lin | 715/726 |
| 6,493,506 | B1 | 12/2002 | Schoner et al. | |
| 6,523,046 | B2 | 2/2003 | Liu et al. | |
| 6,941,324 | B2 | 9/2005 | Plastina et al. | |
| 6,957,388 | B1 * | 10/2005 | Taguchi et al. | 715/723 |
| 6,979,769 | B1 * | 12/2005 | Majima et al. | 84/645 |
| 7,826,709 | B2 * | 11/2010 | Moriya et al. | 715/202 |
| 8,032,012 | B2 * | 10/2011 | Yahata et al. | 386/330 |
| 2001/0056471 | A1 | 12/2001 | Negishi et al. | |
| 2002/0120634 | A1 | 8/2002 | Min et al. | |
| 2002/0147740 | A1 * | 10/2002 | Faraday et al. | 707/500 |
| 2002/0152318 | A1 | 10/2002 | Menon et al. | |
| 2003/0161425 | A1 * | 8/2003 | Kikuchi | 375/354 |
| 2004/0098398 | A1 | 5/2004 | Ahn et al. | |
| 2004/0103446 | A1 * | 5/2004 | Yagi et al. | 725/146 |
| 2004/0109677 | A1 * | 6/2004 | Seo et al. | 386/95 |
| 2004/0111673 | A1 | 6/2004 | Bowman et al. | |
| 2004/0143590 | A1 | 7/2004 | Wong et al. | |
| 2004/0160445 | A1 * | 8/2004 | Whatmough | 345/473 |
| 2004/0167925 | A1 | 8/2004 | Visharam et al. | |
| 2005/0005308 | A1 | 1/2005 | Logan et al. | |
| 2005/0038813 | A1 | 2/2005 | Apparao et al. | |
| 2005/0149557 | A1 * | 7/2005 | Moriya et al. | 707/104.1 |
| 2005/0165846 | A1 | 7/2005 | Tsujii et al. | |
| 2005/0193327 | A1 * | 9/2005 | Chao et al. | 715/513 |
| 2005/0198570 | A1 | 9/2005 | Otsuka et al. | |
| 2005/0201718 | A1 * | 9/2005 | Kato | 386/46 |
| 2005/0207442 | A1 * | 9/2005 | Zoest et al. | 370/465 |
| 2006/0004699 | A1 | 1/2006 | Lehikoinen et al. | |
| 2006/0059190 | A1 | 3/2006 | Fukuoka et al. | |
| 2006/0129909 | A1 * | 6/2006 | Butt et al. | 715/500.1 |
| 2006/0130118 | A1 | 6/2006 | Damm | |
| 2006/0140513 | A1 * | 6/2006 | Tran Xuan et al. | 382/305 |
| 2006/0143235 | A1 | 6/2006 | Takaku | |
| 2007/0143664 | A1 | 6/2007 | Fang et al. | |
| 2007/0168046 | A1 | 7/2007 | Misawa et al. | |
| 2007/0217758 | A1 * | 9/2007 | Yahata et al. | 386/52 |
| 2007/0233725 | A1 | 10/2007 | Michmerhuizen et al. | |
| 2007/0276864 | A1 * | 11/2007 | Espelien | 707/103 X |
| 2008/0294980 | A1 | 11/2008 | Thienot et al. | |
| 2009/0157750 | A1 * | 6/2009 | Kim et al. | 707/104.1 |
| 2010/0225808 | A1 * | 9/2010 | Mears | 348/468 |

FOREIGN PATENT DOCUMENTS

| | | |
|---|---|---|
| EP | 1 496 701 | 1/2005 |
| EP | 1 583 099 | 10/2005 |
| EP | 1 624 680 | 2/2006 |
| EP | 1 626 351 | 2/2006 |
| JP | 2003-109361 | 4/2003 |
| JP | 2003-297015 | 10/2003 |
| JP | 2004-048396 | 2/2004 |
| JP | 2006-164260 | 6/2006 |
| KR | 10-2005-0017133 | 2/2005 |
| WO | WO 99/38098 | 7/1999 |
| WO | WO 03/073770 | 9/2003 |
| WO | WO 03/098475 | 11/2003 |
| WO | WO 2004/054254 | 6/2004 |
| WO | WO 2004/088654 | 10/2004 |
| WO | WO 2005/034092 | 4/2005 |
| WO | WO 2005/039131 | 4/2005 |

OTHER PUBLICATIONS

Office Action for corresponding U.S. Appl. No. 12/311,835 dated May 27, 2011.

Office Action for corresponding U.S. Appl. No. 12/311,834 dated Jul. 11, 2011.

European Search Report dated Dec. 22, 2010 issued in corresponding European application No. 07833439.8.

Search Report for corresponding European Application No. 07833437.2 dated Oct. 5, 2010.

Search Report for corresponding European Application No. 07833438.0 dated Oct. 27, 2010.

Search Report for corresponding European Application No. 07833436.4 dated Nov. 5, 2010.

Office Action for corresponding U.S. Appl. No. 12/311,828 dated Apr. 26, 2011.

USPTO Office Action dated Sep. 26, 2011 for U.S. Appl. No. 12/311,828.

Office Action for corresponding U.S. Appl. No. 12/311,835 dated Nov. 15, 2011.

Office Action for corresponding Japanese Application No. 2009-533251 dated Feb. 7, 2012.

* cited by examiner

【Figure 1】
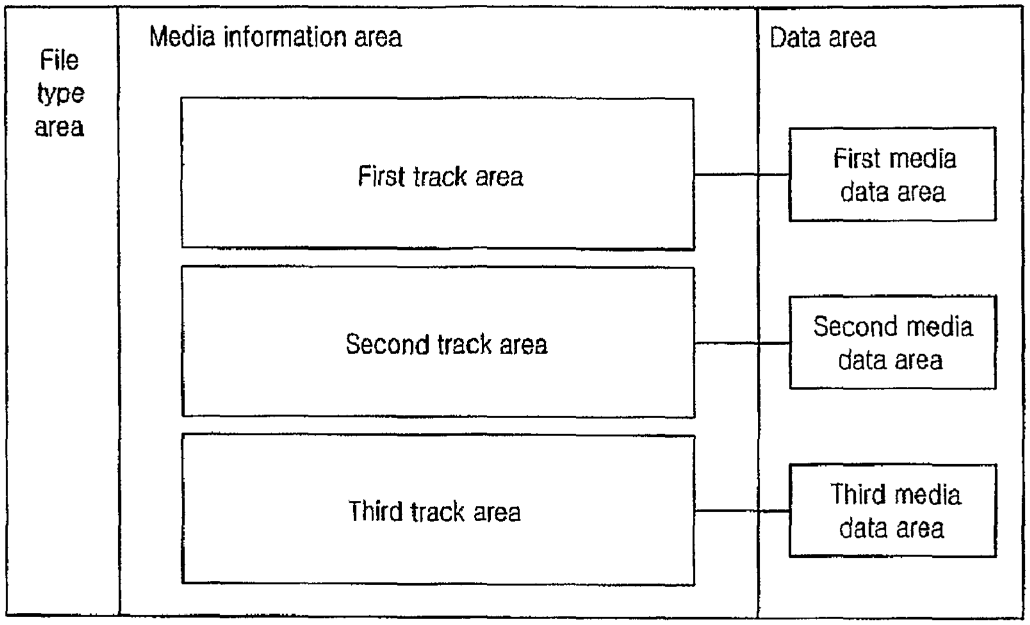

【Figure 2】
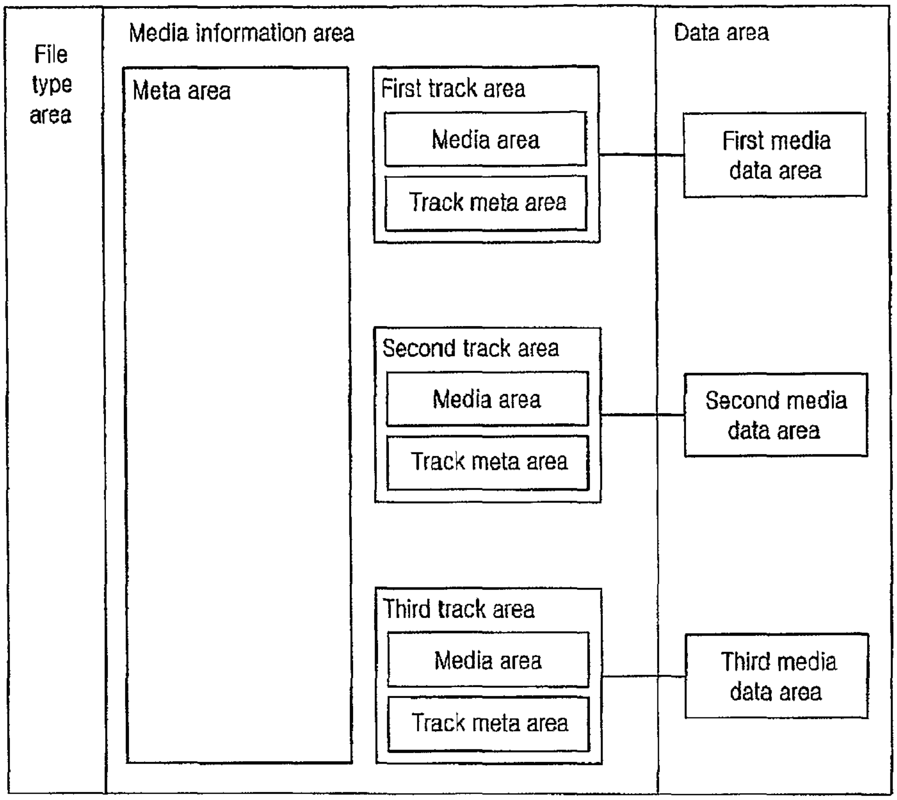

【Figure 3】
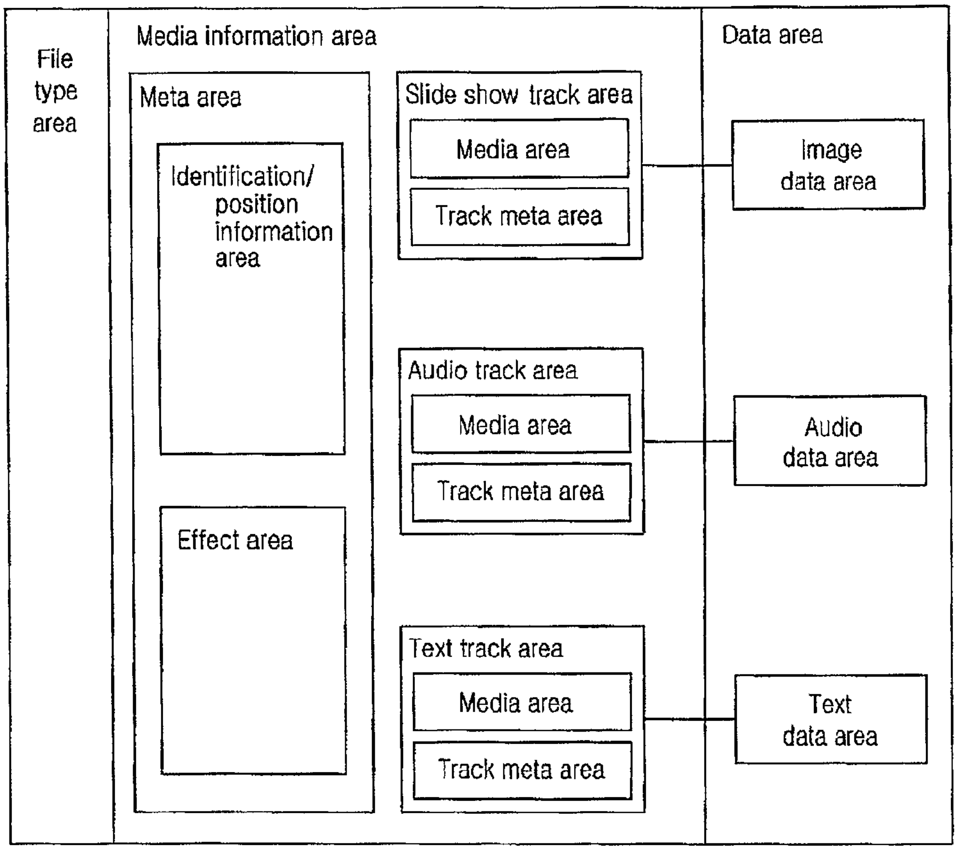

【Figure 4】
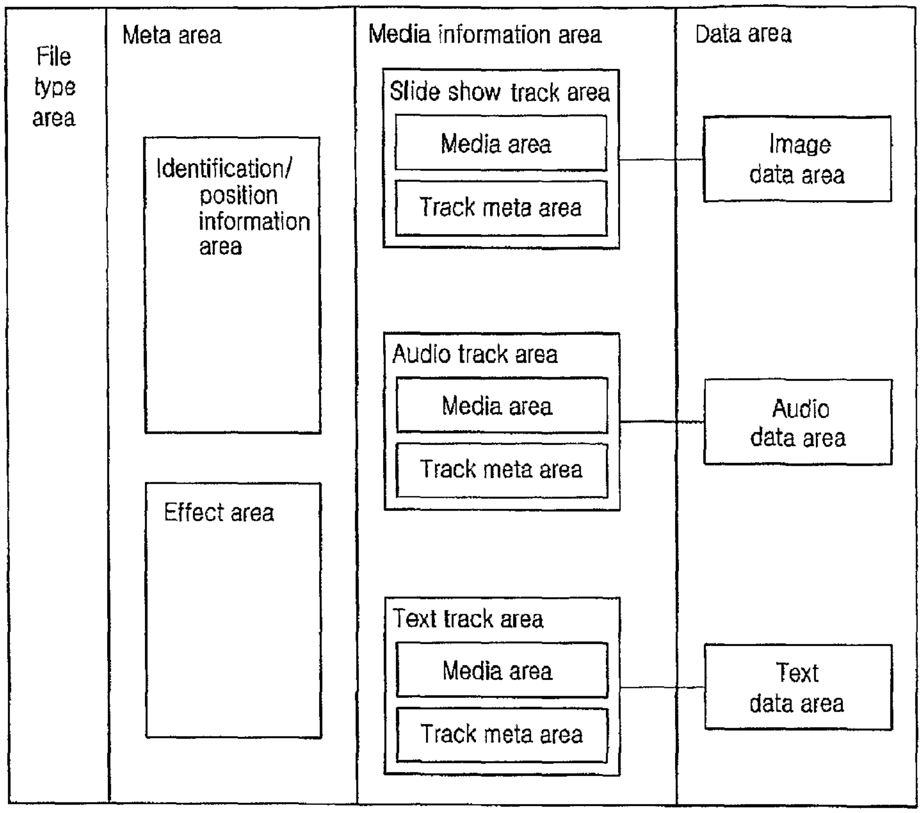

【Figure 5】
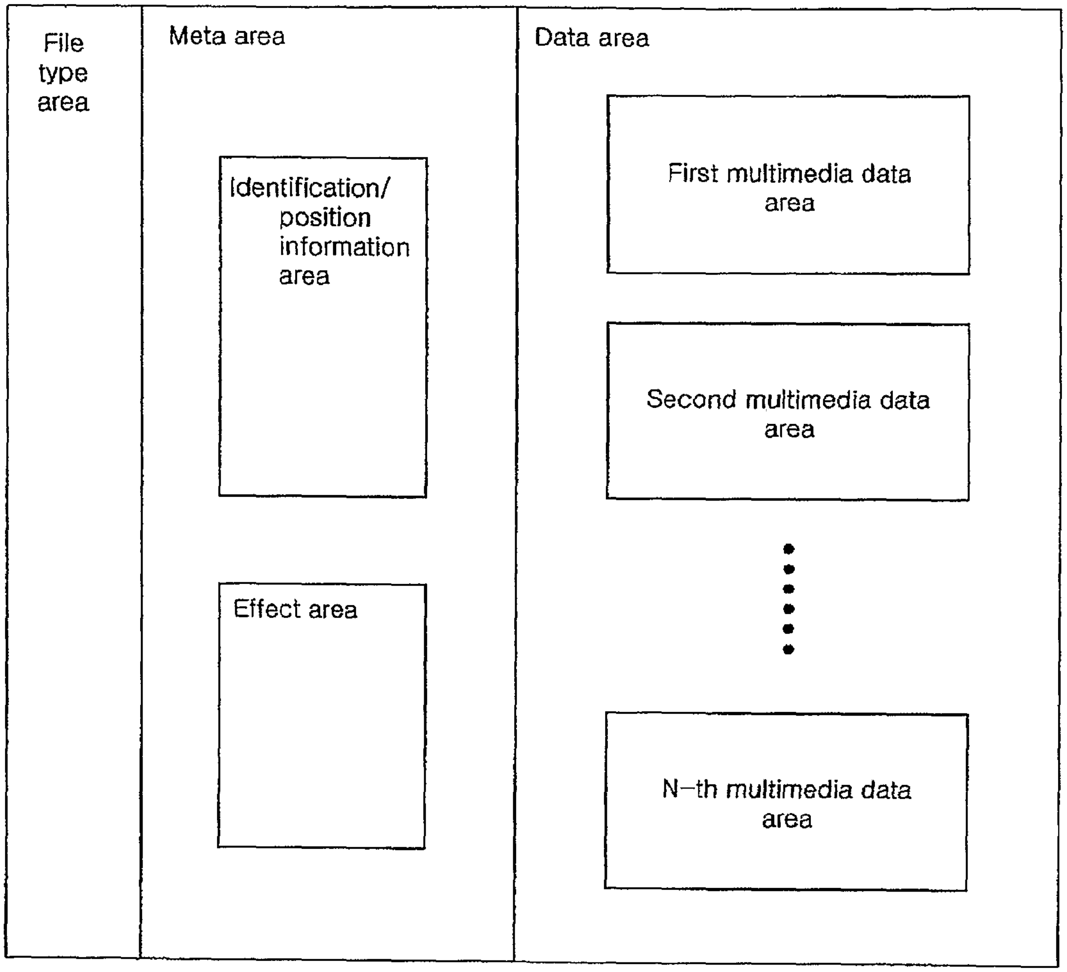

【Figure 6】
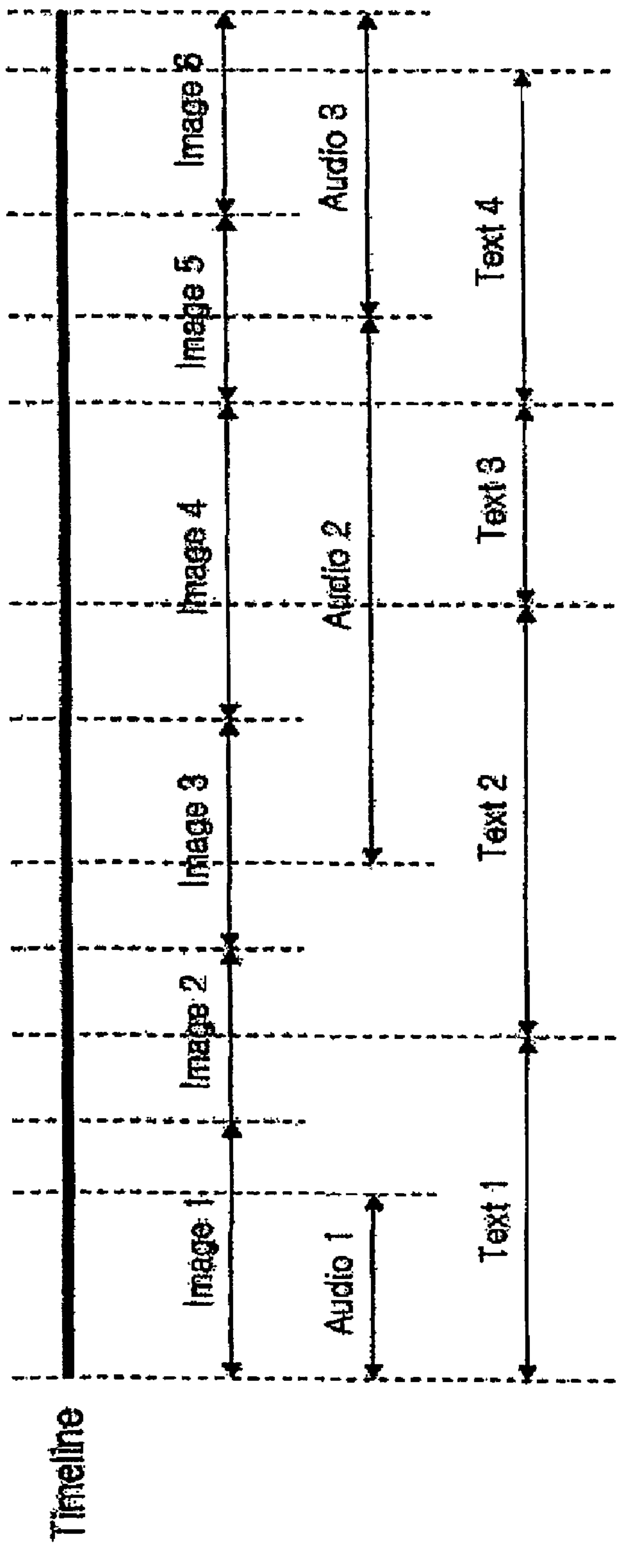

【Figure 7】
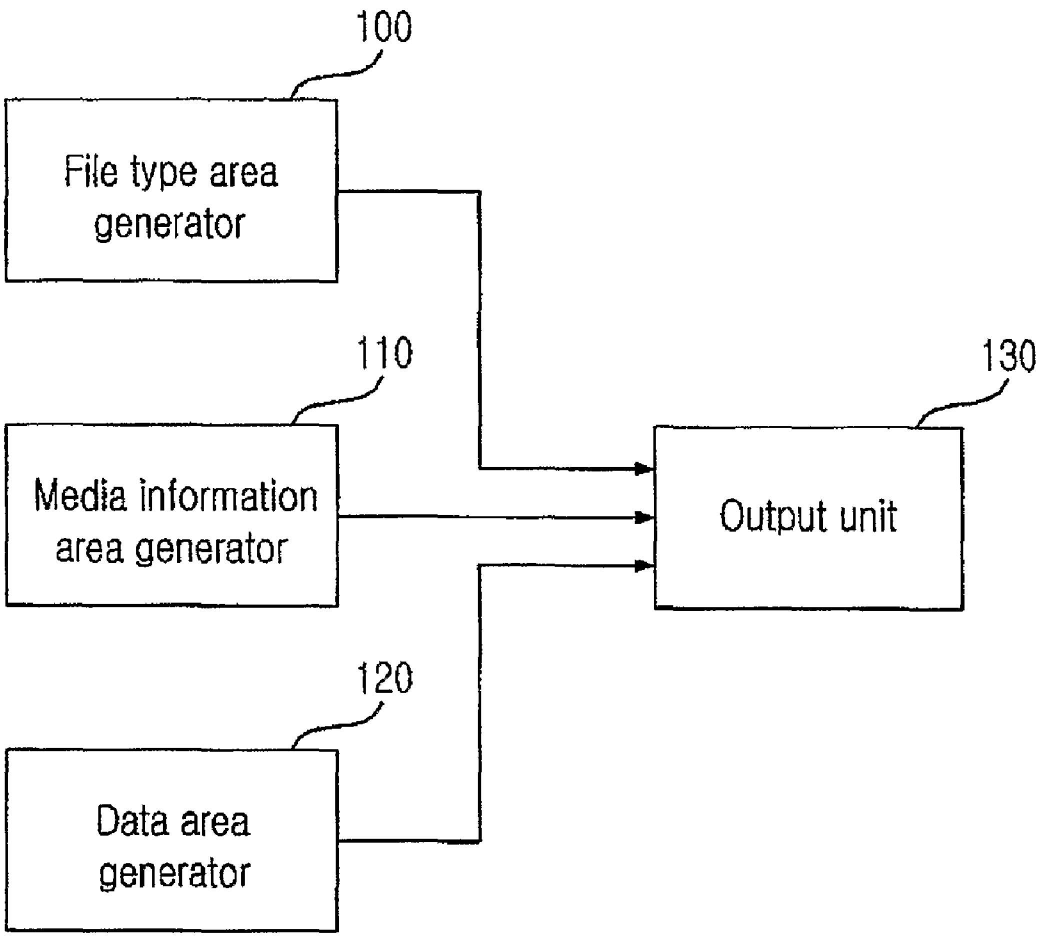

【Figure 8】
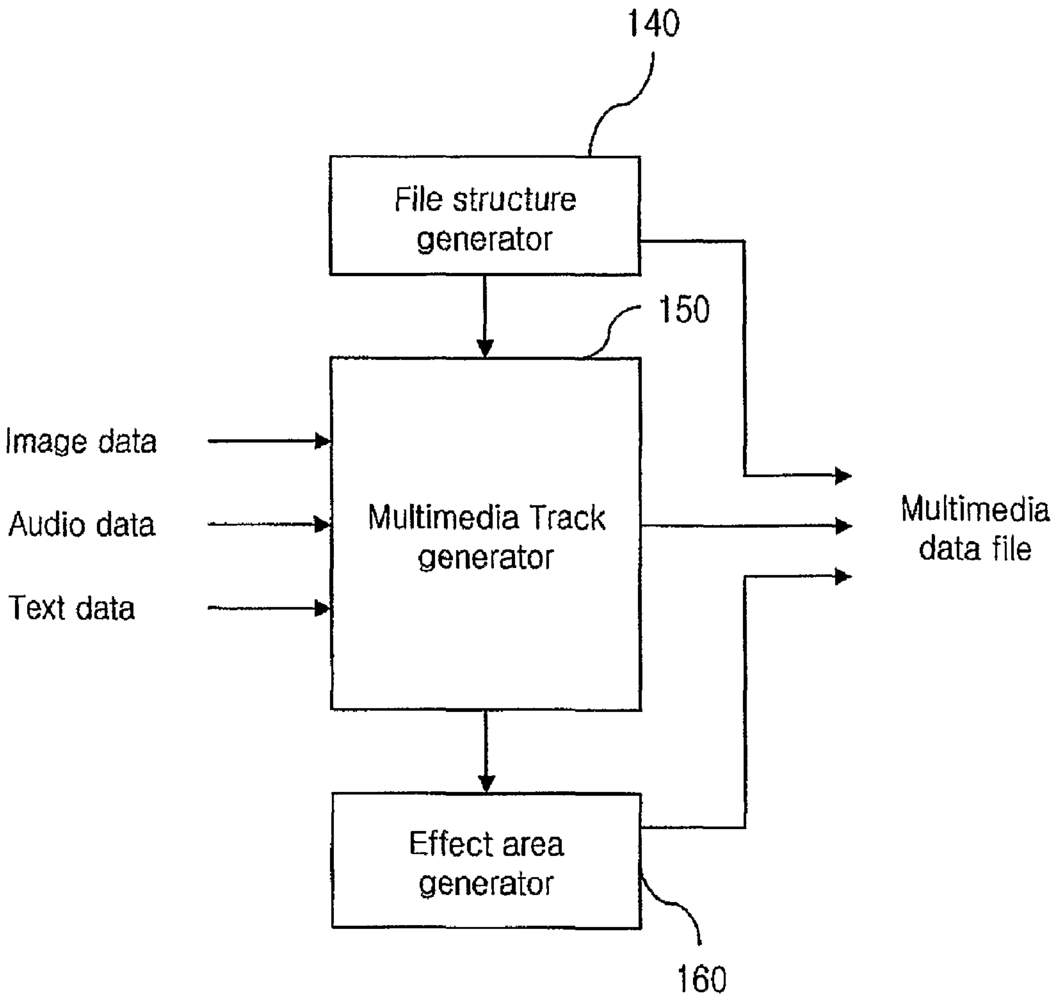

【Figure 9】
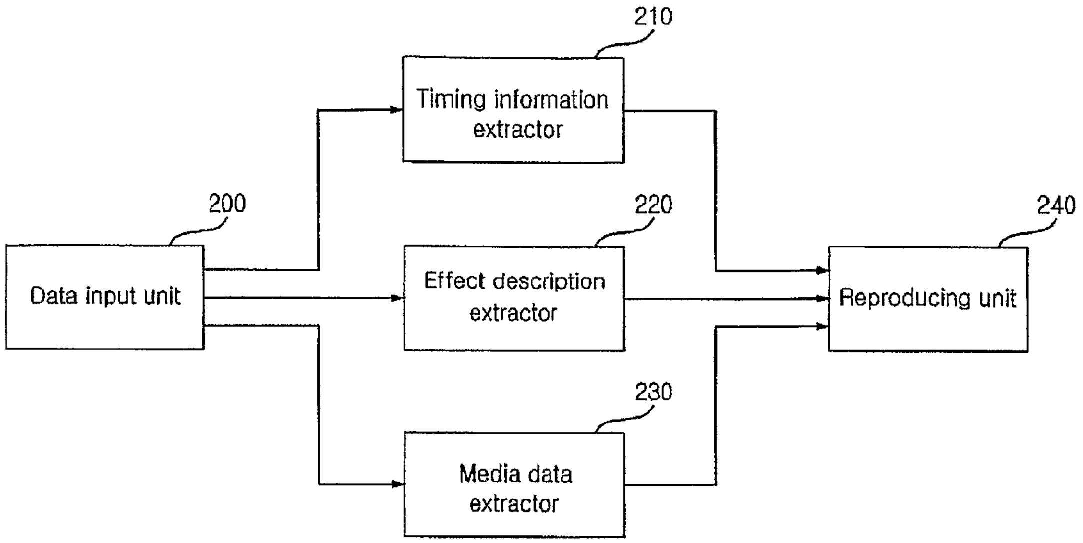

【Figure 10】
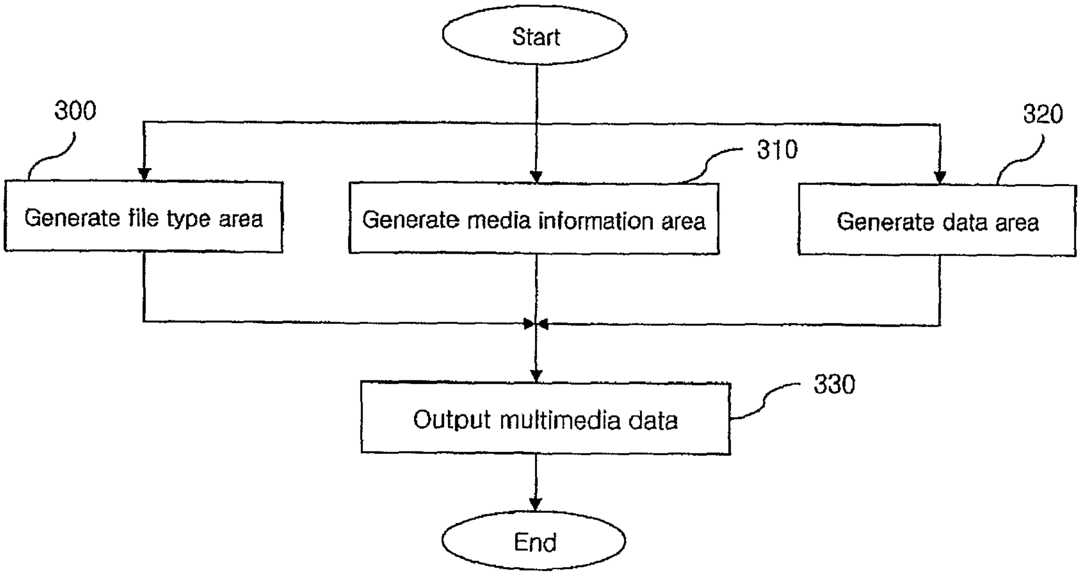

【Figure 11】
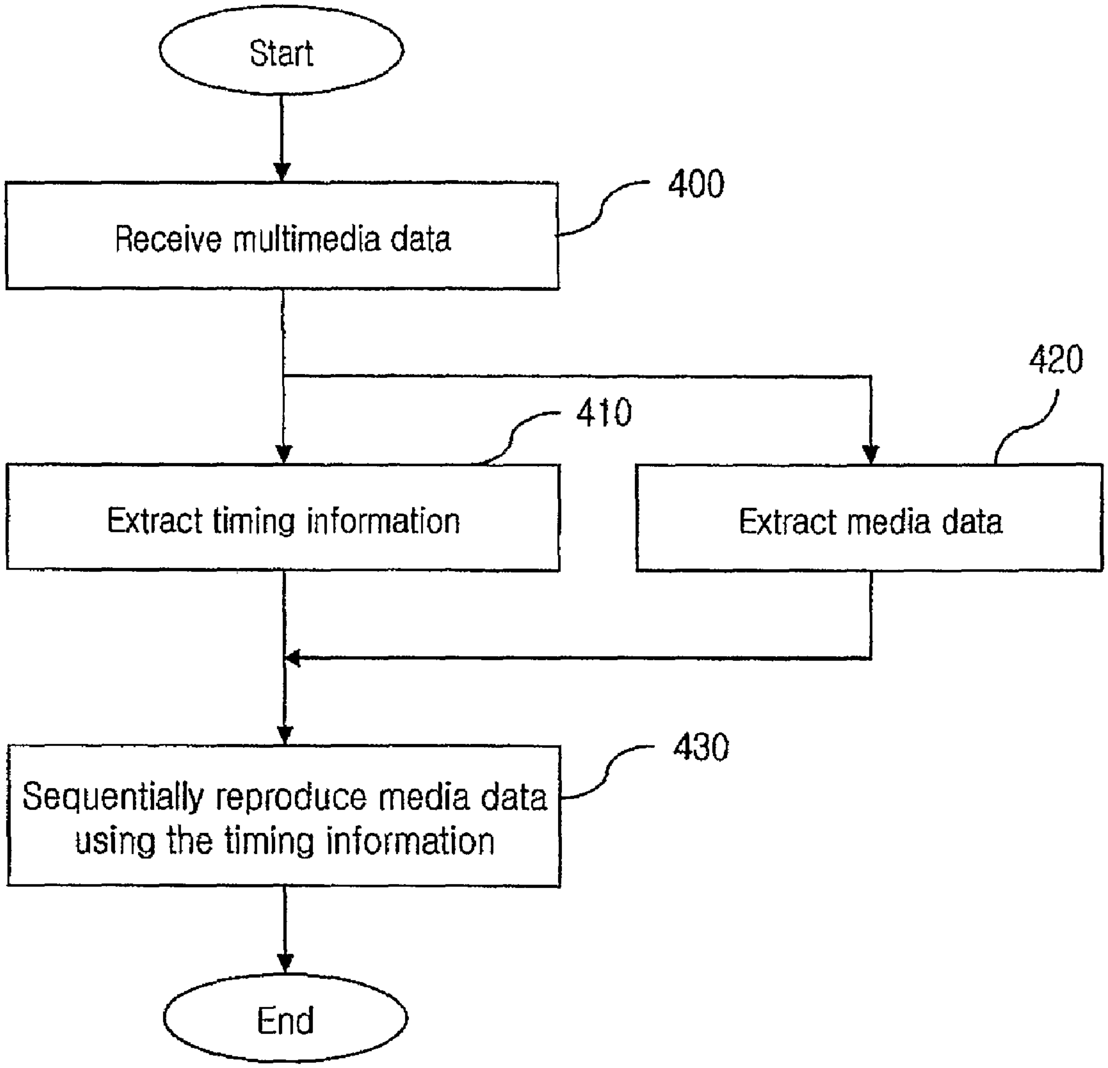

【Figure 12】
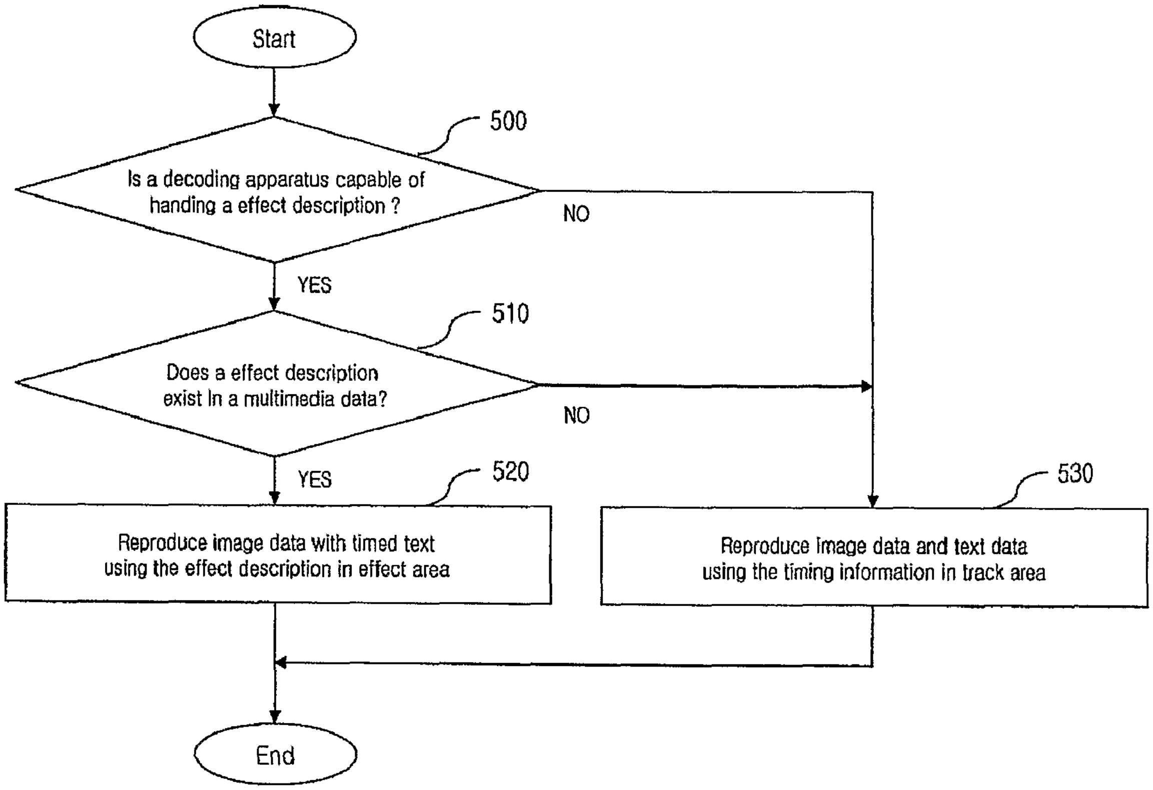

METHOD AND APPARATUS FOR ENCODING/DECODING SIGNAL

This application is a National Phase entry of PCT Application number PCT/KR2007/003378 filed on Jan. 7, 2009, which claims priority under 35 U.S.C. §§119(e), 120 and 365(c) to U.S. Provisional Application Nos. 60/830,086, 60/831,921, 60/852,702, 60/852,703, 60/854,084, 60/879,566, 60/879,569, 60/881,142, and 60/907,809 filed on Jul. 12, 2006, Jul. 20, 2006, Oct. 19, 2006, Oct. 25, 2006, Jan. 10, 2007, Jan. 19, 2007 and Apr. 18, 2007, respectively.

TECHNICAL FIELD

The disclosed embodiments relate to a method and apparatus for encoding/decoding multimedia data, and more particularly, to an encoding/decoding method and apparatus for sequentially reproducing multimedia data, including video, audio, and text, thereby constructing a media presentation (e.g., a slide show).

BACKGROUND ART

Conventional multimedia data processing methods for integrating and encoding/decoding various formats of media data, such as video, audio, and text, often require encoding, decoding and transmitting large amounts of data. Processing large amounts of data can take a long time, which may be unacceptable or undesirable for some multimedia applications.

DISCLOSURE

Technical Problem

The disclosed embodiments provides a multimedia data structure for efficiently encoding/decoding multimedia data, and a multimedia data encoding/decoding method and apparatus using the same.

Technical Solution

According to an aspect of the present invention, there is provided a decoding method. The decoding method comprises According to another aspect of the present invention, there is provided an encoding method. The encoding method comprises According to another aspect of the present invention, there is provided a decoding apparatus. The decoding apparatus comprises According to another aspect of the present invention, there is provided an encoding apparatus. The encoding apparatus comprises According to another aspect of the present invention, there is provided a computer-readable recording medium having a computer program for executing the above-described decoding method or the above-described encoding method.

According to another aspect of the present invention, there is provided a multimedia broadcasting apparatus comprising the above-described decoding apparatus or the above-described encoding apparatus.

ADVANTAGEOUS EFFECTS

The disclosed embodiments include a multimedia data encoding/decoding method and apparatus can construct a slide show using a small amount of multimedia data. Thus, a time taken to process and transmit the multimedia data can be reduced.

DESCRIPTION OF DRAWINGS

The invention will be described in detail with reference to the following drawings in which like numerals refer to like elements.

FIG. 1 is a schematic diagram illustrating an entire structure of multimedia data according to the present invention;

FIG. 2 illustrates a multimedia data structure according to a first exemplary embodiment of the present invention;

FIG. 3 illustrates a multimedia data structure according to a second exemplary embodiment of the present invention;

FIG. 4 illustrates a multimedia data structure according to a third exemplary embodiment of the present invention;

FIG. 5 illustrates a multimedia data structure according to a fourth exemplary embodiment of the present invention;

FIG. 6 illustrates timing information on a plurality of media data according to an exemplary embodiment of the present invention;

FIG. 7 is a block diagram illustrating a construction of an encoding apparatus according to an exemplary embodiment of the present invention;

FIG. 8 is a block diagram illustrating a construction of an encoding apparatus according to a first exemplary embodiment of the present invention;

FIG. 9 is a block diagram illustrating a construction of a decoding apparatus according to a second exemplary embodiment of the present invention;

FIG. 10 is a flowchart illustrating an encoding method according to the present invention;

FIG. 11 is a flowchart illustrating a decoding method according to a first exemplary embodiment of the present invention; and FIG. 12 is a flowchart illustrating a decoding method according to a second exemplary embodiment of the present invention.

BEST MODE

The present invention will hereinafter be described more fully with reference to the accompanying drawings, in which exemplary embodiments of the invention are shown.

FIG. 1 is a schematic diagram illustrating an entire structure of multimedia data according to the present invention. Referring to FIG. 1, in the example shown a multimedia data file includes a file type area, a media information area, and a data area.

The file type area represents a format of a multimedia data file, and may represent a form or version of the multimedia data file. For example, the file type area may represent that the format of the multimedia data file is an MPEG-4 version 2 format when a file type is denoted "mp42."

The data area includes a plurality of media data areas. Each of the media data areas can include media data. Referring to FIG. 1, in the example shown the data area includes first, second, and third media data areas. But, the data area can also include four or more media data areas or two or less media data areas. The media data areas can include several types of media data, such as image data, audio data, or text data. The image data may be still picture data or moving picture data Media data included in the media data areas, respectively, can be synchronized on a single timeline.

In some embodiments, the media information area has information regarding the media data included in the data area. For example, the information may be timing information necessary for reproducing a slide show using the media data. The media information area may include a plurality of track areas respectively corresponding to the plurality of media data areas included in the data area. In some implementations, the media information area may include a first track area, a second track area, and a third track area. The first track area has information regarding the media data included in the first media data area. The second track area has information regarding the media data included in the second media data area. The third track area has information regarding the media data included in the third media data area.

Each of the track areas included in the media information area may have timing information for sequentially reproducing the media data included in the corresponding media data area, thereby constructing a media presentation (e.g., a slide show). For example, a track area may have information on a decoding time of the media data included in a corresponding media data area.

The track area may include several pieces of information on the media data. For example, when the media data is music data, its corresponding track area can include musician information or musical composer information.

FIG. 2 illustrates a multimedia data structure according to a first exemplary embodiment of the present invention. A media information area may include a plurality of track areas respectively corresponding to a plurality of media data areas, and a meta area. The track area may comprise a media area and a track meta area.

The meta area can be included in the media information area at the same level as those of the track areas. The meta area can include information regarding the media data included in the data area. The meta area can include information regarding an attribute for distinguishing a plurality of media data from each other. For example, the meta area may include identification information and position information regarding a plurality of media data included in the data area. In some implementations, the meta area may include name information, contents type information, position information, and size information regarding the media data.

The following is an example of media data information included in the meta area. In this case, the first media data area includes N number of JPEG image data, and the second media data area includes MP3 audio data, and the third media data area includes text data.

MP3
item_ID = 1
item_name = <rel. url to mp3>
content_type = audio/mp3
JPEG 1
item_ID = 2
item_name = <rel. url to jpeg 1>
content_type = image/jpeg
. . .
JPEG N
item_ID = N+1
item_name = <rel. url to jpeg N>
content_type = image/jpeg
Text
item_ID = N+2
item_name = <rel. url to text>
content_type = text In some embodiments, the meta area may include a first meta area and a second meta area which share and include information regarding the media data. For example, the first meta area may include name and content type of the media data, and the second meta area may include physical position and size of the media data.

A handler type of the meta area may be designated to "lsr1".

The above-described information included the meta area may be included in the track meta area.

Referring to FIG. 2, the track area may include a media area, and a track meta area. The media area can include timing information for sequentially reproducing media data, thereby constructing a media presentation. The track meta area can include the meta information regarding the media data.

The timing information on the media data can refer to information on decoding time of the media data on a timeline. Each of the media data can have its own timing information. Thus, the decoding times of the media data, respectively, may be inconsistent with each other. To address this inconsistency, it is desirable that media data included in the data area are dependent on one timeline. In other words, it is desirable that the timing information on media data included in the data area are synchronized on a single timeline.

The media area may include a first area having decoding time information of the media data; a second area having position information on the media data; and a third area having size information on the media data. The media data to be reproduced can be searched using the position and size information included in the second and third areas.

The timing information on the media area may be expressed using the language such as the LASeR, the SVG, or the BIFS. The LASeR, the SVG, or the BIFS can be realized in the XML format or the Binary encoded format.

The timing information on media data included in the data area may be included in one media area, for example, the media area of the first track area. Alternately, the media areas may have the timing information on the corresponding media data, respectively. In other words, the media area of the first track area may have the timing information on the first media data, and the media area of the second track area may have the timing information on the second media data, and the media area of the third track area may have the timing information on the third media data.

The track meta area may include information for distinguishing the media data from each other. In other words, the meta information on the media data may be included in the meta area of the media information area, or included in the track meta area of the track area. In case where the information is included in the meta area, the meta information on media data included in the data area may be included in one meta area. In case where the information is included in the track meta area, the information on media data may be divided and positioned in the track meta area included in the corresponding track area. Also, the track meta area may have an effect description to be applied to the media data, for example, an animation effect, a slide show effect, a timed text effect, etc.

FIG. 3 illustrates a multimedia data structure according to a second exemplary embodiment of the present invention. A data area can include an image data area, an audio data area, and a text data area. An media information area can include a media presentation (e.g., slide show) track area having information on image data, an audio track area having information on audio data, and a text track area having information on text data.

The image data included in the image data area may be still picture data or moving picture data, for example. The image data may be data compressed in a format of Joint Picture Expert Group (JPEG), Moving Picture Expert Group (MPEG)-1, 2, or Advanced Video Coding (AVC). In other words, the image data may include various formats of video clips or photographs acquired by a device (not shown), such as a camcorder (not shown) or a portable terminal (not shown).

In the example shown, a slide show is obtained by reproducing images included in the image data area according to timing information included in the media area of the slide show track area. As mentioned above, the media area of the slide show track area may include decoding time information, position information, and size information of the images included in the image data area.

The following table represents example semantics for a collection level descriptive meta data in track meta area of slide show track area.

| Tag Name | Semantics |
|---|---|
| CreationInformation/ Creation/ Title[@type = "seriesTitle"] | A title of (all) the photos in the collection. |
| CreationInformation/ Creation/ Creator | Describing a person or organization who relates to the creation process of the images in the collection, such as photographer, publisher and so on. Their roles should be described using RoleCS. A variety of methods can be used to identify the Creators, including electronic address elements such as url or email. If the Role is set to "Actor", this field shall describe the identity of persons who appear in the images in the collection. |
| CreationInformation/ CreationCoordinates/ Date/TimePoint | The time (or period in time) when the photos in the collection were captured. The creation time of photos in any sub-collections should be included within the time period for the current collection. |
| CreationInformation/Creation/ Abstract/FreeTextAnnotation | Summary text about the collection. |

The following is a example of description for the meta data in track meta area of slide show track area.

```
<Description xsi:type=" CreationDescriptionType">
  <CreationInformation>
    <Creation>
        <Title type="seriesTitle">Soeun's Birthday</Title>
        <Creator>
            <Role href="urn:mpeg:mpeg7:RoleCS:2001:AUTHOR"/>
            <Agent xsi:type="PersonType">
```

-continued

```
                <Name>
                    <FamilyName>Cha</FamilyName>
                    <GivenName>Jean</GivenName>
                </Name>
            </Agent>
        </Creator>
        <CreationCoordinates>
            <Date>
                <TimePoint>2007-02-22T14:21+00:00</TimePoint>
            </Date>
        </CreationCoordinates>
        <Abstract>
            <FreeTextAnnotation></FreeTextAnnotation>
        </Abstract>
    </Creation>
  </CreationInformation>
</Description>
```

The audio data included in the audio data area may be music data, accompaniment data, or voice data. The audio data can be data compressed in a format of MPEG Layer-3 (MP3) or Advanced Audio Coding (AAC). Alternately, the audio data may be a result obtained by synthesizing the accompaniment data and the voice data. The accompaniment data may be data expressed by only a musical instrument sound excluding a musician's voice in the music.

The audio data included in the audio data area can be reproduced sequentially according to timing information included in the media area of the audio track area. As mentioned above, the media area of the audio track area may include decoding time information, position information, and size information of the audio data included in the audio data area.

The following table represents example semantics for a meta data in track meta area of audio track area.

| Tag Name | ID3 V1 | Semantics |
|---|---|---|
| CreationInformation/Creation/Creator | Artist | Artist performing the song |
| CreationInformation/Creation/Title[@type="albumTitle"] | Album | Title of the album |
| CreationInformation/Creation/Title[@type="songTitle"] | Song Title | Title of the song |
| CreationInformation/CreationCoordinates/Date/TimePoint (Recording date) | Year | Year of the recording |
| CreationInformation/Creation/Abstract/FreeTextAnnotation | Comment | Any comment of any length |
| Semantics/SemanticBase[@xsi:type="SemanticStateType"]/AttributeValuePair | Track | CD track number of song |
| CreationInformation/Classification/Genre[@href="urn:id3:v1:4"] | Genre | ID 3 V1.1 Genre |
| CreationInformation/Classification/Genre[@href="urn:id3:v1:4"]/ Term[@termID="urn:id3:v2:Eurodisco"] CreationInformation/Classification/Genre[@href="urn:id3:v1:4"] CreationInformation/Classification/Genre[@type="secondary]"[@href="urn:id3:v2:Eurodisco"] | | ID 3 V2 Genre (4)(Eurodisco) |

The following is a example of description for the meta data in track meta area of audio track area.

```
<Description xsi:type="CreationDescriptionType">
  <CreationInformation>
   <Creation>
        <Title type="songTitle">I am three years old</Title>
```

-continued

```
        <Title type="albumTitle">Birthday Songs</Title>
        <Abstract>
            <FreeTextAnnotation></FreeTextAnnotation>
        </Abstract>
        <Creator>
            <Role
            href="urn:mpeg:mpeg7:RoleCS:2001:PERFORMER"/>
            <Agent xsi:type="PersonType">
                <Name>
                    <FamilyName>Cha</FamilyName>
                    <GivenName>Soeun</GivenName>
                </Name>
            </Agent>
        </Creator>
        <CreationCoordinates>
            <Date>
                <TimePoint>2007-02-22T14:21+00:00</TimePoint>
            </Date>
        </CreationCoordinates>
    </Creation>
    <Classification>
        <Genre href="urn:id3:cs:ID3genreCS:v1:12">
            <Name>Other</Name>
        </Genre>
    </Classification>
  </CreationInformation>
</Description>
```

The text data included in the text data area may be text strings or lyrics, for example.

Timed text can be obtained by reproducing text strings included in the text data area according to timing information included in the media area of the text track area. As mentioned above, the media area of the text track area may include decoding time information, position information, and size information of the text strings included in the text data area.

The image data may be reproduced in synchronization with a plurality of text strings using the timed text. Timed text is intended to be used for the real time subtitling of foreign-language, captioning for people lacking audio devices or having hearing impairments, karaoke, scrolling news items or teleprompter applications.

Possible application scenarios for using the timed text are as follows.

Various dialogues and related images are used in foreign language exercise materials. Typically, a picture is shown, a dialogue is heard, and then the user is presented with several questions. The questions are presented in a text format as an overlay on top of the picture.

Photo-Music albums are comprised of image slide shows with various kinds of background music, and either personal annotations or song lyrics are displayed in a synchronized way. Story-telling applications utilize multiple JPEG images and text data with synchronization to MP3.

Slide show presentations that contain audio soundtracks can be enriched by having text tracks in forms of subtitles, personal annotations, and text for the introduction. In karaoke applications, the lyrics are synchronized to the song, and dynamically highlighted as the song is played.

To satisfy the application scenarios using timed text, a multi media file may include character set information, glyph information, font information, text color information, closed caption information, dynamic highlight information, text rendering position information and text composition information In some implementations, to express all kinds of languages and various glyphs, Unicode 3.0 may be used for character set. UTF-8 and UTF-16 may be decoded into the required characters. And, fonts which are used for decorating input strings may be specified by name, size, and style. The style may be bold, italic, and bold-italic. The colors of both text and background are indicated by using RGB values.

Text may be rendered within a specified region. The application for the foreign language exercise materials may use this information to overlay texts on top of the images. And, text can be highlighted for emphasis, for example, in karaoke application.

The text data area may include a plurality of text samples, and each of the text samples may include a text string and a text modifier. The text modifier has at least one of style information, highlight information, closed caption information, dynamic highlight information and blink information regarding the corresponding text string.

Also, the media area of the text track area may include timing information and sample descriptions regarding the text strings included in the text data area. The sample description may have font information, position information and background information regarding the text strings.

For example, the format of timed text may be the text format described in 3GPP TS 26.245 or MPEG-4 Part-17, which is a suitable format for implementing the above application scenarios and supporting the above functionalities.

Referring to FIG. 3, a meta area may include an effect area an effect description to be applied to media data. For example, the effect description includes information which specifies an effect to be applied to image data included in image data area. The effect area may include at least one of grouping information on the animation effect, and size information, opacity effect information, and geometrical transform information on the media data to which the animation effect is applied. The grouping information represents a combination of the animation effects to be applied to the media data. The size information describes a variation of an image size when the media data is image data.

The opacity effect information describes an image fade-in or fade-out effect. The geometrical transform information describes effects of transition between images, image scale transform, rotation, and skew, and the like.

The effect area may include information on a motion path of an image or information on motion paths of objects included in the image. The effect area may include image color change information or image form information. The image form information can be a rectangle, a circle, an oval, a line, a polyline, a polygon, and the like. The effect area can include attribute control information for controlling the attribute of the media data, to realize several animation effects applicable to the media data.

The effect description also may specify various types of transition effects. The effect area may also use the well-known Synchronized Multimedia Integration Language (SMIL), for example, the second version of SMIL, to describe the transition effects.

Transition effects of SMIL 2.0 are mostly wipe effects, and they can be divided into five categories, such as Edge Wipes, Iris Wipes, Clock Wipes, Matrix Wipes and Non-SMPTE Wipes. Non-SMPTE Wipes are used for describing the fade, the slideWipe and the pushWipe. The other transition effects can be uniquely defined by describing the transition type and its subtype, and these kinds of effects are defined in the SMPTE-258M specification. The transition type shows the name of the effects, and the subtype shows the directional information or the type-specific information. The transition effects are shown in the following table.

| Transition type | Transition subtypes (SMPTE Wipe Codes in parentheses) |
|---|---|
| | Edge Wipes - wipes occur along an edge |
| "barWipe" | "leftToRight" (1) [default], "topToBottom" (2) |
| "boxWipe" | "topLeft" (3) [default], "topRight" (4), "bottomRight" (5), "bottomLeft" (6), "topCenter" (23), "rightCenter" (24), "bottomCenter" (25), "leftCenter" (26) |
| "fourBoxWipe" | "cornersIn" (7) [default], "cornersOut" (8) |
| "barnDoorWipe" | "vertical" (21) [default], "horizontal" (22), "diagonalBottomLeft" (45), "diagonalTopLeft" (46) |
| "diagonalWipe" | "topLeft" (41) [default], "topRight" (42) |
| "bowTieWipe" | "vertical" (43) [default], "horizontal" (44) |
| "miscDiagonalWipe" | "doubleBarnDoor" (47) [default], "doubleDiamond" (48) |
| "veeWipe" | "down" (61) [default], "left" (62), "up" (63), "right" (64) |
| "barnVeeWipe" | "down" (65) [default], "left" (66), "up" (67), "right" (68) |
| "zigZagWipe" | "leftToRight" (71) [default], "topToBottom" (72) |
| "barnZigZagWipe" | "vertical" (73) [default], "horizontal" (74) |
| | Iris Wipes - shapes expand from the center of the media |
| "irisWipe" | "rectangle" (101) [default], "diamond" (102) |
| "triangleWipe" | "up" (103) [default], "right" (104), "down" (105), "left" (106) |
| "arrowHeadWipe" | "up" (107) [default], "right" (108), "down" (109), "left" (110) |
| "pentagonWipe" | "up" (111) [default], "down" (112) |
| "hexagonWipe" | "horizontal" (113) [default], "vertical" (114) |
| "ellipseWipe" | "circle" (119) [default], "horizontal" (120), "vertical" (121) |
| "eyeWipe" | "horizontal" (122) [default], "vertical" (123) |
| "roundRectWipe" | "horizontal" (124) [default], "vertical" (125) |
| "starWipe" | "fourPoint" (127) [default], "fivePoint" (128). "sixPoint" (129) |
| "miscShapeWipe" | "heart" (130) [default], "keyhole" (131) |
| | Clock Wipes - rotate around a center point |
| "clockWipe" | "clockwiseTwelve" (201) [default], "clockwiseThree" (202), "clockwiseSix" (203), "clockwiseNine" (204) |
| "pinWheelWipe" | "twoBladeVertical" (205) [default], "twoBladeHorizontal" (206), "fourBlade" (207) |
| "singleSweepWipe" | "clockwiseTop" (221) [default], "clockwiseRight" (222), "clockwiseBottom" (223), "clockwiseLeft" (224), "clockwiseTopLeft" (241), "counterClockwiseBottomLeft" (242), "clockwiseBottomRight" (243), "counterClockwiseTopRight" (244) |
| "fanWipe" | "centerTop" (211) [default], "centerRight" (212), "top" (231), "right" (232), "bottom" (233), "left" (234) |
| "doubleFanWipe" | "fanOutVertical" (213) [default], "fanOutHorizontal" (214), "fanInVertical" (235), "fanInHorizontal" (236) |
| "doubleSweepWipe" | "parallelVertical" (225) [default], "parallelDiagonal" (226), "oppositeVertical" (227), "oppositeHorizontal" (228), "parallelDiagonalTopLeft" (245), "parallelDiagonalBottomLeft" (246) |
| "saloonDoorWipe" | "top" (251) [default], "left" (252), "bottom" (253), "right" (254) |
| "windshieldWipe" | "right" (261) [default], "up" (262), "vertical" (263), "horizontal" (264) |
| | Matrix Wipes - media is revealed in squares following a pattern |
| "snakeWipe" | "topLeftHorizontal" (301) [default], "topLeftVertical" (302), "topLeftDiagonal" (303), "topRightDiagonal" (304), "bottomRightDiagonal" (305), "bottomLeftDiagonal" (306) |
| "spiralWipe" | "topLeftClockwise" (310) [default], "topRightClockwise" (311), "bottomRightClockwise" (312), "bottomLeftClockwise" (313), "topLeftCounterClockwise" (314), "topRightCounterClockwise" (315), "bottomRightCounterClockwise" (316), "bottomLeftCounterClockwise" (317) |
| "parallelSnakesWipe" | "verticalTopSame" (320), [default] "verticalBottomSame" (321), "verticalTopLeftOpposite" (322), "verticalBottomLeftOpposite" (323). "horizontalLeftSame" (324), "horizontalRightSame" (325), "horizontalTopLeftOpposite" (326), "horizontalTopRightOpposite" (327), "diagonalBottomLeftOpposite" (328), "diagonalTopLeftOpposite" (329) |
| "boxSnakesWipe" | "twoBoxTop" (340) [default], "twoBoxBottom" (341), "twoBoxLeft" (342), "twoBoxRight" (343), "fourBoxVertical (344), "fourBoxHorizontal" (345) |
| "waterfallWipe" | "verticalLeft" (350) [default], "verticalRight" (351), "horizontalLeft" (352), "horizontalRight" (353) |
| | Non-SMPTE Wipes |
| "pushWipe" | "fromLeft" [default], "fromTop", "fromRight", "fromBottom" |
| "slideWipe" | "fromLeft" [default], "fromTop", "fromRight", "fromBottom" |
| "fade" | "crossfade" [default], "fadeToColor", "fadeFromColor" |

The effect description may specify attributes in the following table for the timing information of the transition effects.

| | |
|---|---|
| type | This is the type or family of transition. |
| subtype | This is the subtype of the transition. This parameter is optional. |
| begin | This is the strat time of the transition. |
| end | This is the end time of the transition. |
| dur | This is the duration of the transition. |
| startProgress | This is the amount of progress through the transition at which to begin execution. |
| endProgress | This is the amount of progress through the transition at which to end execution. |
| direction | This specifies the direction the transition will run. |

The following is a example of an effect description for the transition effect. The following description shows the use of two transition effects, a fade out and a five points start wipe.

```
<lsru:NewScene>
 <lsr:svg width=“267” height=“200” viewBox=“0 0 267 200”>
  <image width=“267” height=“200” xlink:href=“coffee.JPG”>
   <animateTransform id=“img2” attributeName=“transform”
   type=“translate” additive=“sum”
    calcMode=“linear” from=“267 200” to=“0 0”
   begin=“img1.end” end=“img1.end+4” dur=“4”
    repeatDur=“indefinite”/>
   <animate attributeName=“opacity” calcMode=“linear”
   values=“0.00” begin=“img2.end”
    end=“img2.end+24” dur=“24” repeatDur=“indefinite”/
  </image>
  <image width=“267” height=“200” xlink:href=“chess.JPG”>
   <transition id=“starBegin” type=“starWipe”
   subtype=“fivePoint” dur=“4s” />
  </image>
 </lsr:svg>
</lsru:NewScene>
```

The effect area may also include a description of a timed text effect. The images included in the image data area may be reproduced in synchronization with a plurality of text strings using the timed text effect description.

The timed text effect description may include character set information, glyph information, font information, text color information, closed caption information, dynamic highlight information, “karaoke”, text rendering position information and text composition information.

Dynamic highlighting may be implemented by using a combination of timed text effect and the above-described transition effect. For example, text strings with two different colors can be displayed on the same location, on top of one another, and when the highlighting starts, the text string that is displayed on top is wiped out from left to right. For this example, “barWipe” is assigned as the type, and the subtype is “leftToRight”.

The following is a example of an effect description for the dynamic highlighting. In the following example, two same strings with different color are displayed, during highlighting which is from about one to four seconds, and the yellow strings are wiped out from left to right

```
<g font-family=“Verdana” font-size=“18” >
  <text x=“10” y=“170” fill=“blue”>Sample of a dynamic
  highlight.</text>
  <text x=“10” y=“170” fill=“yellow”>Sample of a dynamic highlight.
        <transition id=“EdgewipeBegin” type=“barWipe”
```

-continued

```
        subtype=“leftToRight” begin=“1” end=“4”/>
  </text>
  <animate id=“NULL” attributeName=“opacity” calcMode=“linear”
  values=“0.0” begin=“5” end=“12” />
  <animate id=“NULL” attributeName=“opacity” calcMode=“linear”
  values=“1.0” begin=“1” end=“5” />
  <animate id=“NULL” attributeName=“opacity” calcMode=“linear”
  values=“0.0” begin=“0” end=“1” />
</g>
```

The effect area may also an effect description which specifies timing information of a plurality of images for a slide show effect.

The effect area may include a description which specifies the animation effect, the timed text effect, and the slide show effect.

Referring to FIG. 4, a meta area may be positioned on a file level, not included in a media information area. In other words, a multimedia data file may be comprised of four areas: a file type area, the meta area, a media information area, and a data area.

The effect area may use a language such as Light-weight Application Scene Representation (LASeR), Scalable Vector Graphics (SVG), or Binary Format for Scenes (BIFS), to describe an effect, a timed text effect or a slide show effect. The LASeR, SVG, or BIFS can be realized in an eXtensible Mark-up Language (XML) format or a Binary encoded format. The effect area also may use Synchronized Multimedia Integration Language (SMIL).

The following is an example of the effect description expressed using the SVG, and expresses the opacity effect information, the scale transform information, and the size variation information.

```
<svg>
  <g id=“Article_Image”>
    <animate attributeName=“opacity” calcMode=“linear”
    values=“0.00;1.00;1.00;1.00;1.00;1.00;1.00;1.00”
    dur=“8.0” repeatDur=“indefinite”/>
    <animateTransform attributeName=“transform” type=“scale”
    additive=“sum” calcMode=“linear” values=“1.00
    1.00;1.00 1.00;1.00 1.00;1.00 1.00;0.50 1.00;0.00 1.00;1.00 1.00”
    dur=“8.0” repeatDur=“indefinite”/>
    <image width=“200” height=“150” #sampleID = 1>
    </image>
  </g>
</svg>
```

A symbol (<) signifies a start, and a symbol (>) signifies an end. A symbol (/) signifies an end of a context to be defined. For example, a context of <svg> to </svg> is a bundle, and a context of <g id=“Article_image”> to </g> is a bundle, and a context of <image width=“200” height=“150” #sample=1> to </image> is a bundle. The “g” denotes a group and the “Article_image” represents a name of the group (g) in the <g id=“Article_image”>. The “opacity” and “transform” are names of animation attributes or animation effects. The “opacity” and “transform” represent opacity effect and geometrical transform, respectively. A symbol (sum) represents a sum of the animation attributes. A symbol (dur) represents information on the decoding time of the image data. A symbol (infinite) signifies indefiniteness.

In case that the image data is regarded as one sample, an image to be realized by the image data (#sampleID=1) having an identification number (ID) of ‘1’ has a width of 200 and a height of 150 in size. The animation effect information expresses an animation effect of linearly (calcMode="linear") indefinitely repeating (repeatDur="indefinite") a non-opacity variation for the image data (#sampleID=1) from a full non-opacity (value=0.00) to an original non-opacity (value=1.00) during eight seconds (dur="8.0"). Also, the animation effect information expresses an animation effect of linearly (calcMode="linear") indefinitely repeating (repeatDur="indefinite") the size variation ("transform, "scale") of the image data (#sampleID=1) from an original image size (value=1.00) to a half of a horizontal-direction size of an image (value=y; x=1.00; 0.50) during eight seconds (dur="8.0"). Also, the animation effect information depicts simultaneous implementation (additive="sum") of the two animation effects.

The image data comprised of one or more samples is distinguished from each other in a chunk unit. The samples can be arranged in a temporal sequence at each chunk. Each sample included in the chunk has its inherent identification number (ID). The inherent identification number (ID) of each sample can be given starting from '1'. The image data (#sampleID=1) having the inherent identification number (ID) of '1' represents, not data itself, its sample.

FIG. 5 illustrates a multimedia data structure according to a fourth exemplary embodiment of the present invention. Referring to FIG. 5, a multimedia data file includes a file type area, a meta area, and a data area. The data area includes a plurality of multimedia data areas. Each of the multimedia data areas may include a multimedia data file which has file structure illustrated in any one of FIG. 1 through FIG. 4. For example, Each of the multimedia data areas may include a file type area, a media information area, and a data area.

The meta area includes information regarding an attribute for distinguishing the plurality of multimedia data included in data area from each other. For example, Identification/position information area may include identification information and position information regarding the plurality of multimedia data included in the data area. In detail, Identification/position information area of the meta area may include name information, contents type information, position information, and size information regarding the plurality of multimedia data, respectively.

By using the multimedia data structure as shown in FIG. 5, a collection of several multimedia data, for example, a play list may be implemented.

FIG. 6 illustrates timing information on a plurality of media data according to an exemplary embodiment of the present invention. An image data area has six pieces of image data, and an audio data area has three pieces of audio data, and a text data area has four pieces of text data.

As shown in FIG. 6, a plurality of media data are synchronized on a single timeline, but have timing information separately. Therefore, decoding time may not be consistent with each other. It is desirable that each of the media data included in the media data area has decoding time information, position information, and size information.

A media area of a slide show track area can have all of the decoding time information, the position information, and the size information on the six pieces of image data, the three pieces of audio data, and the four pieces of text data. In another exemplary embodiment, a media area of a slide show track area has decoding time information, position information, and size information on six pieces of image data. A media area of an audio track area has decoding time information, position information, and size information on three pieces of audio data. A media area of a text track area can have decoding time information, position information, and size information on four pieces of text data.

FIG. 7 is a block diagram illustrating an encoding apparatus according to a first exemplary embodiment of the present invention. The encoding apparatus includes a file type area generator 100, a media information area generator 110, a data area generator 120, and an output unit 130. An operation of the encoding apparatus shown in FIG. 7 will be described with reference to FIG. 10. FIG. 10 is a flowchart illustrating a encoding method according to an exemplary embodiment of the present invention.

The file type area generator 100 generates a file type area representing a format of a multimedia data file (Step 300). The media information area generator 110 generates a media information area including information on media data, for example, timing information on the media data included in a data area (Step 310). The data area generator 120 generates a data area including a plurality of media data areas (Step 320).

A sequence of generating the area in the encoding apparatus shown in FIG. 7 is merely one example of an operation of the encoding apparatus according to the present invention. Thus, it is not intended to limit the scope of the present invention. The area generation sequence can be modified, or two or more areas can be simultaneously generated in parallel.

The output unit 130 constructs the generated file type area, media information area, and data area as one file, and outputs the encoded multimedia data (Step 330).

A description of the file type area, the media information area, and the data area is the same as the above description and thus, will be omitted.

FIG. 8 is a block diagram illustrating an encoding apparatus according to a second exemplary embodiment of the present invention. The encoding apparatus includes a file structure generator 140, a multimedia track generator 150, and an effect area generator 160.

The multimedia track generator 150 generates a plurality of track areas respectively corresponding to a plurality of input media data, for example, image data, audio data, and text data. The plurality of track areas is included in the media information area.

The effect area generator 160 generates an effect area including a description of an animation effect, a timed text effect, and slide show effect.

The file structure generator 140 generates a file structure including the plurality of multimedia track areas, and the effect area.

FIG. 9 is a block diagram illustrating a construction of a decoding apparatus according to an exemplary embodiment of the present invention. The decoding apparatus includes a data input unit 200, a timing information extractor 210, an effect description extractor 220, a media data extractor 230, and a reproducing unit 240. An operation of the decoding apparatus shown in FIG. 9 will be described with reference to FIG. 11. FIG. 11 is a flowchart illustrating a decoding method according to an exemplary embodiment of the present invention.

The data input unit 200 receives multimedia data (Step 400). The timing information extractor 210 extracts timing information on media data from the received multimedia data (Step 410). It is desirable that the timing information extractor 210 parses a media information area from the received multimedia data and then, extracts the timing information on the media data from a media area included in the media information area.

The media data extractor 230 extracts the media data to be reproduced depending on the extracted timing information from a data area (Step 420). It is desirable that the media data extractor 230 searches the data area for the media data, using size information and position information on the media data included in the media area.

The reproducing unit 240 sequentially reproduces the extracted media data using the extracted timing information, thereby constructing a media presentation (e.g., a slide show) (Step 430).

In case where there exists an effect description in an effect area, the effect description extractor 220 parses the effect area, and extracts the effect description. The reproducing unit 240 may reproduce image data included in an image data area, using the effect description. In addition, the reproducing unit 240 reproduce audio data and text data, using the timing information extracted by the timing information extractor 210.

FIG. 12 is a flowchart illustrating a decoding method according to an exemplary embodiment of the present invention.

Referring to FIG. 12, if a decoding apparatus is not capable of handling an effect description (Step 500), the reproducing unit 240 reproduces images in the image data area sequentially using timing information included in the slide show track area, and reproduces text strings in the text data area sequentially using timing information included in the text track area (Step 530).

If a multimedia data does not include an effect description in the effect area (Step 500), the reproducing unit 240 reproduces images and text strings in the data area sequentially using timing information included in the track area (Step 530).

If a decoding apparatus is capable of handling an effect description (Step 500) and the multimedia data includes the effect description, the reproducing unit 240 can apply an animation effect to images using the animation effect description, and reproducing the images in synchronization with timed text using a timed text effect description in the effect area (Step 520).

Audio data included in the audio data area can be reproduced sequentially using timing information included in the audio track area.

The encoding/decoding method according to the present invention can be programmed for execution in a computer and stored in a computer readable recording medium. The multimedia data having the data structure according to the present invention can be also stored in the computer readable recording medium. The computer readable recording medium includes all kinds of storage units storing data readable by a computer system. The computer readable recording medium is exemplified as a Read Only Memory (ROM), a Random Access Memory (RAM), a Compact-Disk Read Only Memory (CD-ROM), a magnetic tape, a floppy disk, and an optic data storage unit, and includes a unit realized in a format of carrier wave (e.g., Internet transmission). The computer readable recording medium is dispersed to the computer system connecting thereto through a network, and can store and execute a computer readable code in a dispersion method. Function program, code and code segments for realizing a user tracking method can be easily inferred by programmers in a technological field of the present invention.

INDUSTRIAL APPLICABILITY

As described above, an encoding/decoding method and apparatus according to the present invention can be widely used for a multimedia player or a multimedia coding device for reproducing a plurality of media data, thereby reducing a time taken to process and transmit the multimedia data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A decoding method implemented by a processor, comprising:

receiving multimedia data which includes a file type area having file format information, a data area including media data, and a media information area including a slide show area and an audio track area corresponding to image data and audio data in the data area, respectively, the slide show area including a media area and a track meta area, the media area of the slide show area including decoding time information, position information, and size information on a plurality of image data, each decoding time information, position information, and size information in the media area of the slide show area being allocated for each image data in the data area;

parsing the multimedia data, the media information area of the multimedia data being parsed first;

extracting timing information related to the decoding time information from the media area of the slide show area of the media information area;

extracting the media data to be reproduced depending on the extracted timing information; and reproducing the extracted media data using the extracted timing information, wherein media data included in the data area is synchronized on a single timeline, wherein images used in the slide show presentation are arranged in a single track, wherein each track meta area of the slide show area and the audio track area includes meta information on the image data and the audio data, respectively, wherein the track meta area of the slide show area includes a collection level descriptive meta data, and the collection level descriptive meta data includes title information of a group of a plurality of image data in the data area, wherein each track meta area of the slide show area and the audio track area includes XML format data on the meta information.

2. The decoding method of claim 1, wherein the multimedia data comprises at least one of character set information, glyph information, font information, text color information, closed caption information, dynamic highlight information, text rendering position information and text composition information.

3. The decoding method of claim 1, wherein the data area includes text data, and the text data comprises a text modifier having at least one of style information, highlight information, closed caption information, dynamic highlight information and blink information.

4. The decoding method of claim 1, wherein the data area includes text data, and the text data comprises a plurality of text samples, and each of the text samples comprises a text string and a text modifier.

5. The decoding method of claim 1, wherein the media information area comprises a text track area which includes a media area and a track meta area, the media area of the text track area having timing information regarding the text strings, and the track meta area of the text track area having meta information regarding the text strings.

6. The decoding method of claim 5, wherein the media area of the text track area comprises at least one of font information, position information and background color information of the text string.

7. The decoding method of claim 1, wherein the multimedia data further includes an effect area including an effect description to be applied to image data included in the data area, and the effect description specifies a slide show effect, a timed text effect and an animation effect.

8. The decoding method of claim 1, wherein the multimedia data further includes an effect area including an effect description to be applied to image data included in the data area, and the effect area is described using one of Lightweight Application Scene Representation (LASeR), Scalable Vector Graphics (SVG), and Binary Format for Scenes (BIFS).

9. The decoding method of claim 1, wherein the multimedia data further includes an effect area including an effect description to be applied to image data included in the data area, and the effect area is described using an eXtensible Markup Language (XML) format or a binary encoded format.

10. The decoding method of claim 1, wherein the multimedia data comprises a meta area including meta information regarding the media data, and an effect area is included in the meta area.

11. The decoding method of claim 1, wherein the multimedia data further includes an effect area including an effect description to be applied to image data included in the data area, and the effect description comprises at least one of character set information, glyph information, font information, text color information, closed caption information, dynamic highlight information, text rendering position information and text composition information.

12. The decoding method of claim 1, the multimedia data is received as a broadcast signal.

13. The decoding method of claim 1, further comprising receiving the multimedia data on a digital medium.

14. An encoding method implemented by a processor, comprising:

generating a file type area having file format information;

generating a media information area which comprises a plurality of track areas respectively corresponding to media data;

generating a data area including the media data; and constructing the generated file type area, media information area, and data area as one file, and outputting encoded multimedia data;

wherein the media data included in the data area is synchronized on a single timeline, and wherein a slide show area of the plurality of track areas includes a media area and a track meta area, wherein the media area of the slide show area includes decoding time information, position information, and size information on a plurality of image data, each decoding time information, position information, and size information in the media area of the slide show area being allocated for each image data in the data area, wherein the multimedia data includes the file type area, data area, and media information area, wherein images used in a slide show presentation are arranged in a single track, wherein each track meta area of the slide show area and the audio track area includes meta information on the image data and the audio data, respectively, wherein the track meta area of the slide show area includes a collection level descriptive meta data, and the collection level descriptive meta data includes title information of a group of a plurality of image data in the data area wherein each track meta area of the slide show area and the audio track area includes XML format data on the meta information.

15. The encoding method of claim 14, further comprising:

generating an effect area including an effect description to be applied to image data, wherein the effect area includes a description of a timed text effect.

16. The encoding method of claim 14, wherein the data area further includes a text data area, wherein a track area corresponding to the text data area comprises a first area, a second area, and a third area which include timing information, position information, and size information for reproducing timed text.

17. The encoding method of claim 14, further comprising:

generating an effect area including an effect description to be applied to image data, wherein the effect area is described using one of Lightweight Application Scene Representation (LASeR), Scalable Vector Graphics (SVG), and Binary Format for Scenes (BIFS).

18. A decoding apparatus comprising:

a processor coupled to a memory;

a data input unit, controlled by the processor, which receives multimedia data that includes a file type area having file format information, a data area including media data, and a media information area including a plurality of track areas respectively corresponding to the media data, a slide show area of the plurality of track areas including a media area and a track meta area, the media area of the slide show area including decoding time information, position information, and size information on a plurality of image data, each decoding time information, position information, and size information in the media area of the slide show area being allocated for each image data; and a timing information extractor, controlled by the processor, which extracts timing information related to the decoding time information from the media area of the slide show area of the media information area;

a media data extractor, controlled by the processor, which extracts the media data to be reproduced depending on the extracted timing information; and a reproducing unit, controlled by the processor, which reproduces the extracted media data using the extracted timing information, wherein media data included in the data area is synchronized on a single timeline, wherein images used in the slide show presentation are arranged in a single track, wherein each track meta area of the slide show area and the audio track area includes meta information on the image data and the audio data, respectively, wherein the track meta area of the slide show area includes a collection level descriptive meta data, and the collection level descriptive meta data includes title information of a group of a plurality of image data in the data area, wherein each track meta area of the slide show area and the audio track area includes XML format data on the meta information.

19. The decoding apparatus of claim 18, wherein the multimedia data further comprises an effect area which includes a description of a slide show effect, a timed text effect and an animation effect to be applied to image data included in the data area.

20. The decoding apparatus of claim 19, wherein the reproducing unit reproduces the image data in synchronization with timed text using the effect description.

21. The decoding apparatus of claim 18, wherein the multimedia data further comprises at least one of character set information, glyph information, font information, text color information, closed caption information, dynamic highlight information, text rendering position information and text composition information.

22. An encoding apparatus comprising:

a processor coupled to a memory;

a file type area generator, controlled by the processor, which generates a file type area having file format information;

a data area generator, controlled by the processor, which generates a data area including media data;

a media information area generator, controlled by the processor, which includes a plurality of track areas respectively corresponding to the media data, a slide show area of the plurality of track areas including a media area and a track meta area, the media area of the slide show area including decoding time information, position information, and size information on a plurality of image data, each decoding time information, position information, and size information in the media area of the slide show area being allocated for each image data; and an output unit, controlled by the processor, which constructs the generated file type area, media information area, and data area as one file, and outputs encoded multimedia data, wherein the media data included in the data area is synchronized on a single timeline, wherein images used in the slide show presentation are arranged in a single track, wherein each track meta area of the slide show area and the audio track area includes meta information on the image data and the audio data, respectively, wherein the track meta area of the slide show area includes a collection level descriptive meta data, and the collection level descriptive meta data includes title information of a group of a plurality of image data in the data area, wherein each track meta area of the slide show area and the audio track area includes XML format data on the meta information.

23. The encoding apparatus of claim 22, further comprising:

an effect area generator which generates an effect area including an effect description to be applied to image data, wherein the effect area further comprises a description of a timed text effect.

* * * * *